(12) United States Patent
Sato

(10) Patent No.: US 11,182,118 B2
(45) Date of Patent: Nov. 23, 2021

(54) IMAGE FORMING APPARATUS, CONTROL METHOD FOR THE SAME, IMAGE FORMING SYSTEM AND STORAGE MEDIUM

(71) Applicant: CANON KABUSHIKI KAISHA, Tokyo (JP)

(72) Inventor: Haruki Sato, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/866,610

(22) Filed: May 5, 2020

(65) Prior Publication Data
US 2020/0364018 A1   Nov. 19, 2020

(30) Foreign Application Priority Data
May 15, 2019   (JP) .............................. JP2019-092272

(51) Int. Cl.
G06F 3/12         (2006.01)
H04N 1/00        (2006.01)

(52) U.S. Cl.
CPC .......... G06F 3/1296 (2013.01); G06F 3/1293 (2013.01); H04N 1/00244 (2013.01)

(58) Field of Classification Search
CPC . G06F 3/1296; G06F 3/1293; H04N 1/00244; H04N 1/324
See application file for complete search history.

(56) References Cited

U.S. PATENT DOCUMENTS

| 2002/0126306 A1* | 9/2002 | Chohsa | ................... G06F 3/128 358/1.13 |
| 2003/0133145 A1* | 7/2003 | Koppich | ............ H04N 1/00209 358/1.15 |

(Continued)

FOREIGN PATENT DOCUMENTS

| JP | 4577803 B2 * | 11/2010 |
| JP | 4577803 B2   | 11/2010 |

OTHER PUBLICATIONS

Candidate Standard 5100.18-2015 IPP Shared Infrastructure Extensions (INFRA, Jun. 19, 2015, The Printer Working Group, URL: https://ftp.pwg.org/pub/pwg/candidates/cs-ippinfra10-20150619-5100.18.pdf (Apr. 25, 2019).

(Continued)

Primary Examiner — Ted W Barnes
(74) Attorney, Agent, or Firm — Venable LLP

(57) ABSTRACT

The image forming apparatus operations include setting a setting value for communication with a server based on a user operation and receiving an event notification in either one of a server push method and a pull method based on the setting value. In the server push method, the event notification is received from the server via a communication session established and being kept between the image forming apparatus and the server, and in the pull method an event acquisition request is transmitted from the image forming apparatus to the server and the event notification is received as a response to the event acquisition request. In a case where the event notification indicating the occurrence of a print job is received, the print job is acquired, and in a case where the server push method is rejected by the server, the event notification is received in the pull method.

16 Claims, 16 Drawing Sheets

(56) References Cited

U.S. PATENT DOCUMENTS

| | | | | |
|---|---|---|---|---|
| 2004/0032614 A1* | 2/2004 | Tanaka | H04N 1/32523 | 358/1.15 |
| 2009/0067418 A1* | 3/2009 | Toscano | H04L 51/066 | 370/357 |
| 2009/0135445 A1* | 5/2009 | Tateyama | H04N 7/163 | 358/1.15 |
| 2010/0118341 A1* | 5/2010 | Ozawa | H04N 1/32771 | 358/1.15 |
| 2011/0179354 A1* | 7/2011 | Park | G06F 3/1208 | 715/274 |
| 2011/0306003 A1* | 12/2011 | Kody | H04N 1/0022 | 433/24 |
| 2012/0188600 A1* | 7/2012 | Oshima | G06F 3/1288 | 358/1.15 |
| 2012/0236359 A1* | 9/2012 | Mihara | G06F 3/1288 | 358/1.15 |
| 2012/0307293 A1* | 12/2012 | Natori | G06F 3/124 | 358/1.15 |
| 2013/0003118 A1* | 1/2013 | Ito | G06F 3/1262 | 358/1.15 |
| 2013/0135667 A1* | 5/2013 | Oh | G06F 3/1288 | 358/1.15 |
| 2013/0188221 A1* | 7/2013 | Ohno | G06F 3/1222 | 358/1.15 |
| 2013/0286432 A1* | 10/2013 | Matsuyama | G06F 3/1296 | 358/1.15 |
| 2014/0268236 A1* | 9/2014 | Ohara | G06F 3/1224 | 358/1.15 |
| 2015/0002895 A1* | 1/2015 | Nakatsuka | G06F 3/126 | 358/1.15 |
| 2015/0124282 A1* | 5/2015 | Minagawa | G06F 3/1222 | 358/1.15 |
| 2015/0146243 A1* | 5/2015 | Tsujimoto | G06F 3/1273 | 358/1.15 |
| 2017/0070640 A1* | 3/2017 | Kondoh | H04N 1/32657 | |
| 2017/0272587 A1* | 9/2017 | Kondoh | G06F 3/1254 | |
| 2017/0310835 A1* | 10/2017 | Kyoo | G06F 3/1237 | |
| 2018/0060004 A1* | 3/2018 | Watanabe | G06F 3/1205 | |
| 2019/0163421 A1* | 5/2019 | Tadachi | H04N 1/4406 | |

OTHER PUBLICATIONS

Haruki Sato, U.S. Appl. No. 16/567,217, filed Sep. 11, 2019.

* cited by examiner

| USER ACCOUNT | AUTHORITY | CLOUD ACCOUNT | PASSWORD |
|---|---|---|---|
| Alice | Print/Copy/Send | alice@cloudservice.example.com | ****** |
| Bob | Print/Copy | bob@cloudservice.example2.com | ****** |
| Carol | Print | | ****** |

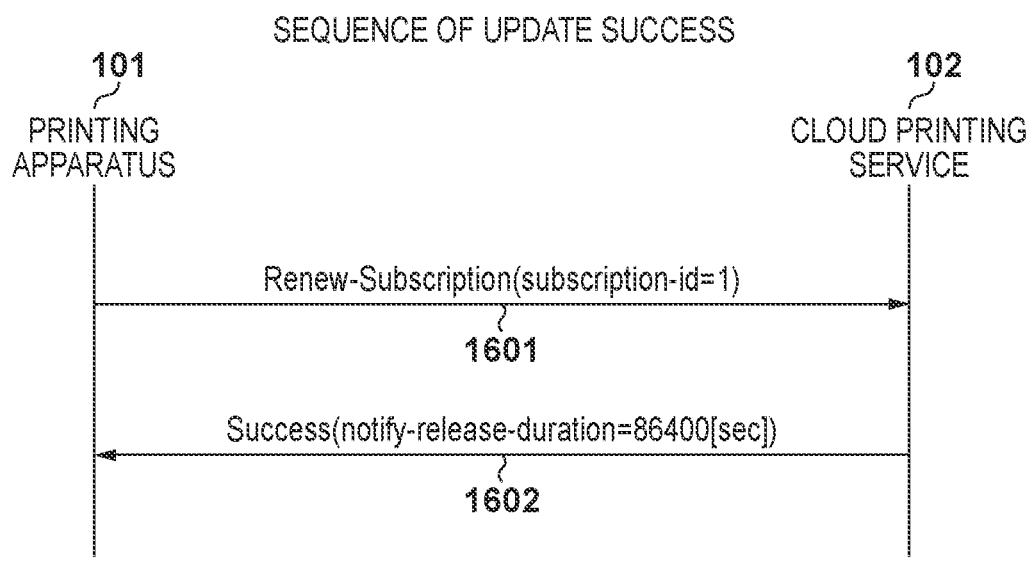
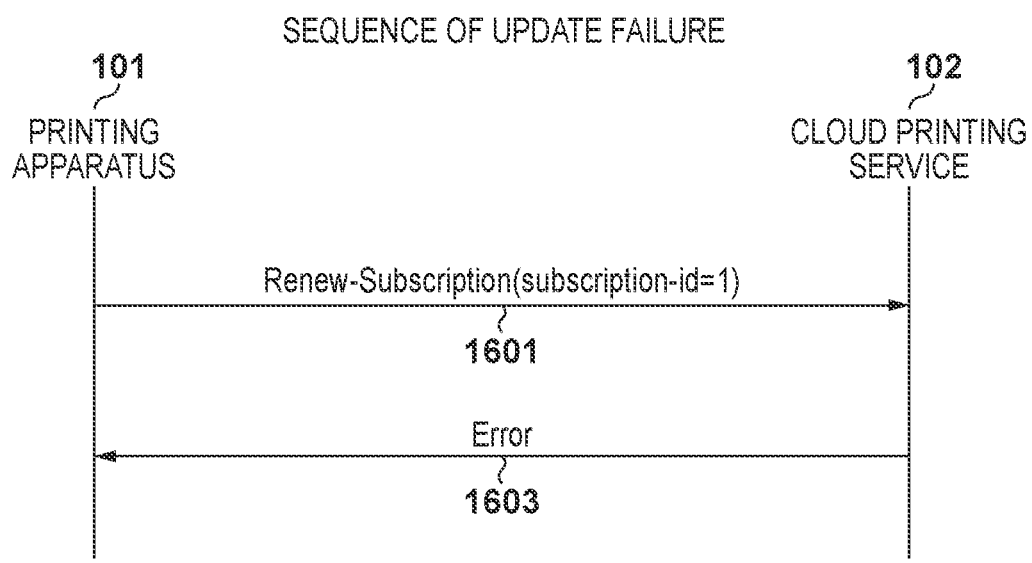

CLOUD PRINT JOB LIST:

| RECEIVED DATE AND TIME | JOB TITLE | ✓ |
|---|---|---|
| 2018/08/22 13:09 | REPORT DOCUMENT.doc | ☑ |
| 2018/08/23 09:10 | PRESENTATION DOCUMENT.ppt | ☐ |
| 2018/08/23 10:50 | USER GUIDE.pdf | ☑ |

PRINT

IMAGE FORMING APPARATUS, CONTROL METHOD FOR THE SAME, IMAGE FORMING SYSTEM AND STORAGE MEDIUM

BACKGROUND OF THE INVENTION

Field of the Invention

The present invention relates to an image forming apparatus, a method for controlling the same, an image forming system, and a storage medium, and more particularly, to a method for controlling event detection in a cloud-based printing service.

Description of the Related Art

In conventional printing services, printing is realized by a user directly transmitting a print job from a client terminal such as a PC or the like to a printing apparatus. On the other hand, in recent years, cloud printing services that use a cloud service provided on the Internet have been proposed. In cloud printing services, when a client terminal or the like transmits a print request (or a print job) to the cloud printing service, a print job related to the print request is acquired by a designated printing apparatus from among previously registered print jobs, and printing is executed. The presence of a print job in the cloud printing service is notified by the sending of an event notification from the cloud printing service to notify a printing apparatus that a job reception event has occurred.

Here, there are two methods for notification of events from the cloud printing service to the printing apparatus: a pull method and a push method. In the pull method, when the printing apparatus transmits an event acquisition request to the cloud printing service, event notifications are returned in response thereto. Therefore, a connection may be established each time an event is acquired. The event acquisition request is transmitted by the printing apparatus at a polling interval specified by the cloud printing service. On the other hand, in the push method, once the printing apparatus has established a connection with the cloud printing service, and transmitted an event acquisition request, the cloud printing service, through the connection, transmits an event notification to the printing apparatus every time an event occurs.

Further, a technique proposed in Japanese Patent No. 4577803 is a prior art related to an event notification method between a server apparatus and a client apparatus connected by a data communication path. In the system proposed in Japanese Patent No. 4577803, it is determined whether to use the push method or the pull method based on server capabilities/load conditions/event occurrence frequency at the time of occurrence of the event and client capabilities/load conditions/reference frequency, and the server transmits the event to the client by the determined method.

As examples of a cloud printing service as described above, PWG 5100.18 proposes a configuration of IPP-Infra using IPP (Internet Printing Protocol) as a print protocol. IPP is a printing protocol for exchanging print data between a computer at a remote location and a printing apparatus by using an HTTP protocol used on the Internet (see NPL1).

NPL1: Candidate Standard 5100.18-2015 IPP Shared Infrastructure Extensions (INFRA, Jun. 19, 2015, The Printer Working Group, URL: https://ftp.pwg.org/pub/pwg/candidates/cs-ippinfra10-20150619-5100.18.pdf (searched Apr. 25, 2019)

The push method is suitable as an event notification method between the cloud printing service and the printing apparatus for enabling a user (e.g., a client terminal) to transmit a print job to the cloud printing service and then the printing apparatus to process the print job without a time lag so that the user can output print material. When the push method is employed, the printing apparatus needs to maintain the network connection with the cloud printing service.

Meanwhile, in recent user network environments in which printing apparatuses are used, there are cases in which a persistent connection with an Internet environment is prohibited for the purpose of preventing unauthorized access or external attack. A printing apparatus installed in such a user environment cannot use a cloud printing service for notifying events of the push method that requires a persistent network connection.

SUMMARY OF THE INVENTION

The present invention has been made in view of the above-mentioned conventional example, and provides a mechanism by which it is possible to flexibly divide usage between the pull method and the push method depending on an operation environment.

The present invention has the following configuration. Specifically, according to one aspect of the present invention, there is provided an image forming apparatus operable to acquire an event notification indicating an occurrence of a print job from a server and to acquire and execute the print job in accordance with content of the event notification, the image forming apparatus comprising: at least one memory that stores a set of instructions; and at least one processor that executes the instructions, the instructions, when executed, causing the image forming apparatus to perform operations comprising: setting a setting value for communication with the server based on a user operation; based on the set setting value, changing whether to make a request to the server such that the event notification be performed by a push method each time the print job occurs or to make a request to the server such that the event notification be performed by a pull method in response to an event acquisition request; and in a case where the event notification is received, acquiring and processing the print job whose occurrence is notified by the acquired event notification.

According to the present invention, it is possible to provide a mechanism by which it is possible to flexibly divide usage between the pull method and the push method depending on an operation environment.

Further features of the present invention will become apparent from the following description of exemplary embodiments with reference to the attached drawings.

BRIEF DESCRIPTION OF THE DRAWINGS

FIG. 14A and FIG. 14B are sequence diagrams of communication processing between the printing apparatus and the cloud printing service according to embodiments.

FIG. 19 is a screen configuration diagram illustrating a list of retained jobs.

DESCRIPTION OF THE EMBODIMENTS

Figure 1:
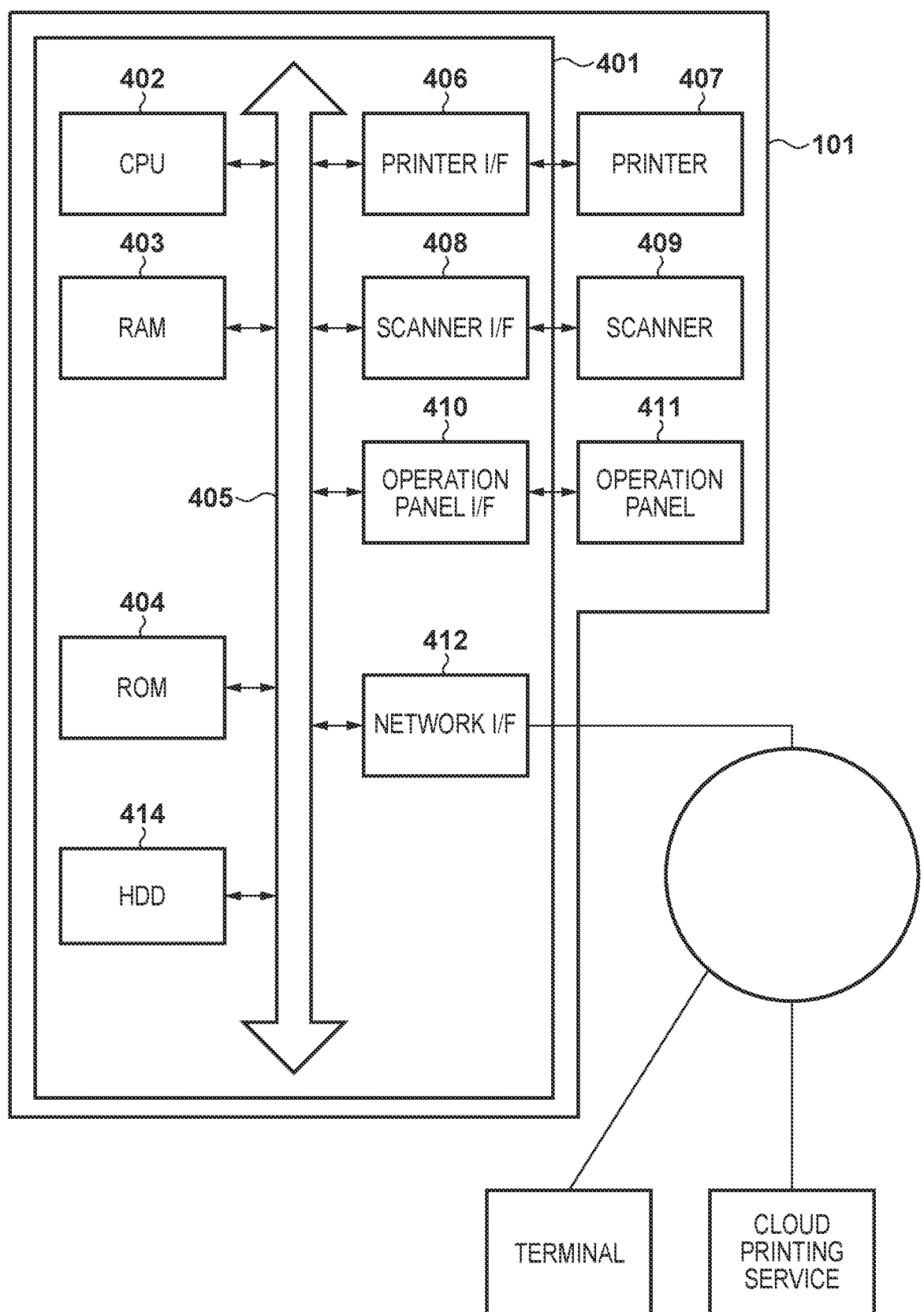
FIG. 1 is a hardware configuration diagram of the printing apparatus according to present embodiments.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

● Configuration of Printing Apparatus

FIG. 1 is a block diagram illustrating a hardware configuration of a printing apparatus 101 according to the present embodiment. The printing apparatus is an apparatus or device having a printing function, and may be a single-function apparatus or apparatus having multiple functions such as copying. The printing apparatus is sometimes referred to as an image forming apparatus, and a system including the image forming apparatus is referred to as an image forming system. In FIG. 1, a printing apparatus 101, a server providing a cloud printing service 102 and a terminal 100 are connected to each other via a communication network. In the printing apparatus 101, a control unit 401 including a CPU 402 controls the operation of the printing apparatus 101 as a whole. Each block in the control unit 401 is connected by a system bus 405. The CPU 402 is a processor that reads out a control program stored in a ROM 404 and performs various controls such as communication control. A RAM 403 is a main memory of the CPU 401, and is used as a temporary storage area such as a work area in addition to storage of programs and data. An HDD 414 stores data, various programs, and various information tables.

A printer I/F 406 serves as an interface for outputting image signals to a printer 407 (printer engine). Also, a scanner I/F 408 serves as an interface for inputting read image signals from a scanner 409 (scanner engine). The CPU 402 processes image signals inputted by the scanner I/F 408 and outputs the processed image signals as print image signals to the printer I/F 406.

An operation panel I/F 410 connects an operation panel 411 and the control unit 401. The operation panel 411 includes a liquid crystal display unit having a touch panel function, a keyboard, and the like. A network I/F 412 transmits information to an external terminal such as the client terminal 100 or the cloud printing service 102, or receives various types of information from an external apparatus.

A server that provides the cloud printing service 102 and the terminal device 100 may have a configuration of a general-purpose computer such as a processor, a memory, a communication function, and a user interface, and therefore description thereof is omitted here. In the following description, the cloud printing service 102 may be referred to as the server 102. The terminal device 100 may be referred to as the client terminal 100.

Figure 2:
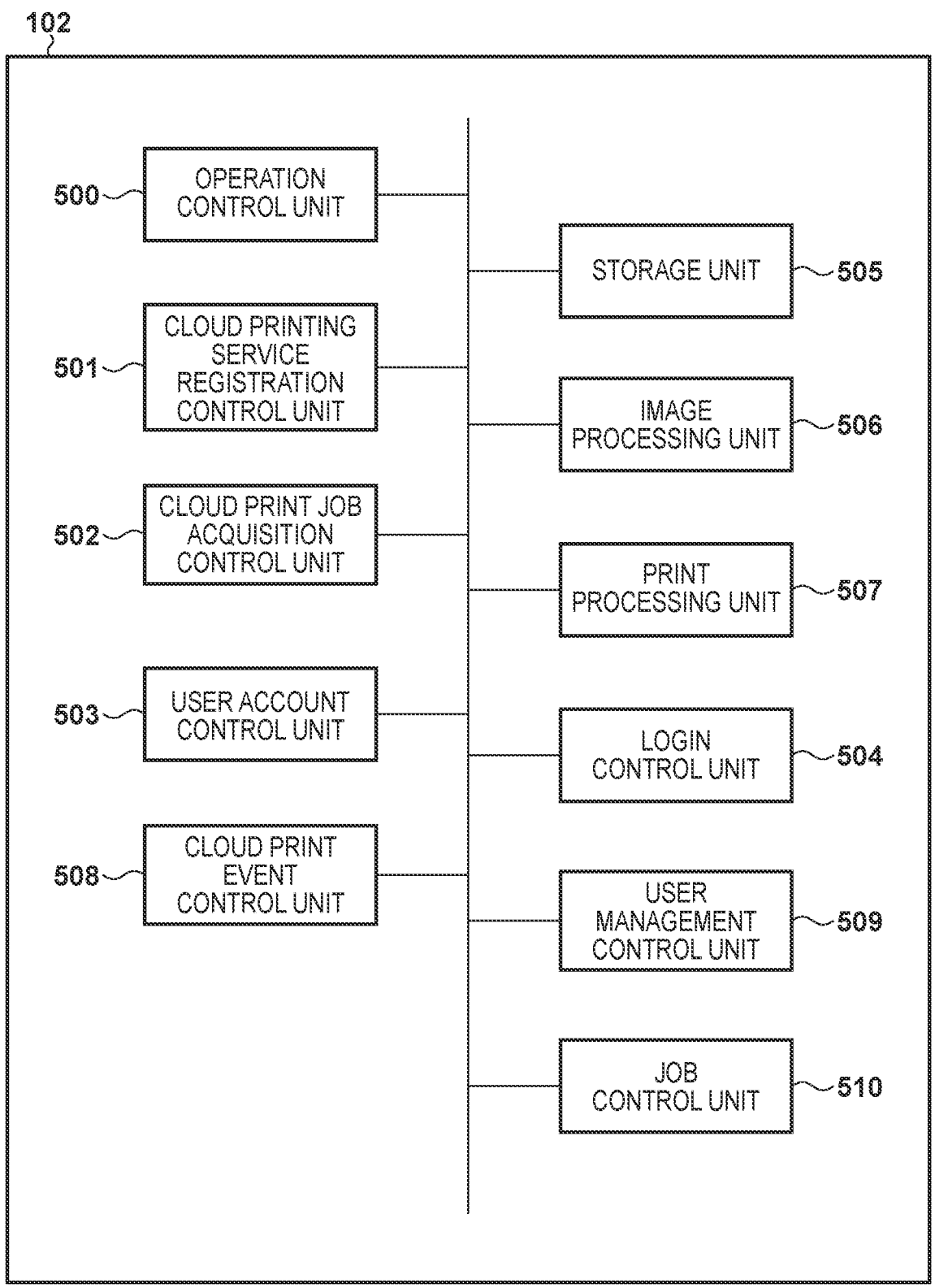
FIG. 2 is a software configuration diagram of the printing apparatus in present embodiments.

FIG. 2 is a diagram for explaining a software configuration of the printing apparatus 101. The functional units illustrated in FIG. 2 are realized by the CPU 402 included in the printing apparatus 101 and executing a control program.

An operation control unit 500 controls the operation panel 411. The operation control unit 500 displays an operation menu on the operation panel 411 to wait for an instruction input from the user, notifies the received instruction content to other functional units, and displays the instruction result on the operation panel 411.

A cloud printing service registration control unit 501 analyzes a cloud printing service registration request 111 received from the client terminal 100, and transmits a cloud printing service registration request 112 to the cloud printing service 102. This controls the cloud printing service registration processing.

A cloud print job acquisition control unit 502 controls a process of transferring the print data 134 received from the cloud printing service 102 to a job control unit 510 together with a print job execution instruction. The job control unit 510 controls job execution in accordance with instructions from other control units. A cloud print event control unit 508 controls event transmission and event reception processing between the printing apparatus 101 and the cloud printing service 102.

A storage unit 505 stores the specified data in a ROM 204 or an HDD 214 or reads the stored data in accordance with an instruction from another functional unit. An example of the data managed by the storage unit 505 is user management information of the printing apparatus.

An image processing unit 506 performs a process of rendering a print job into image data for printing in accordance with an instruction from the job control unit 510. The print processing unit 507 performs processing for transmitting image data rendered by the image processing unit 506 to the printer 207 as image signals via the printer I/F 206 and printing.

The user account control unit 503 manages the user account information stored in the storage unit 505. The login control unit 504 controls login processing to the printing apparatus 101 using user account information managed by the user account control unit 503. A user management control unit 509 controls the user management processing of the printing apparatus 101. When the user management setting (not illustrated) stored in the storage unit 505 is ON, the user management control unit controls the operation control unit 500 to display a login screen. Here, the state in which the user management setting is ON is a state in which the operation of the printing apparatus for each user is managed and controlled. In this state, it is necessary for the user to log in in order to operate the printing apparatus 101 from the operation panel 411.

Figure 3:
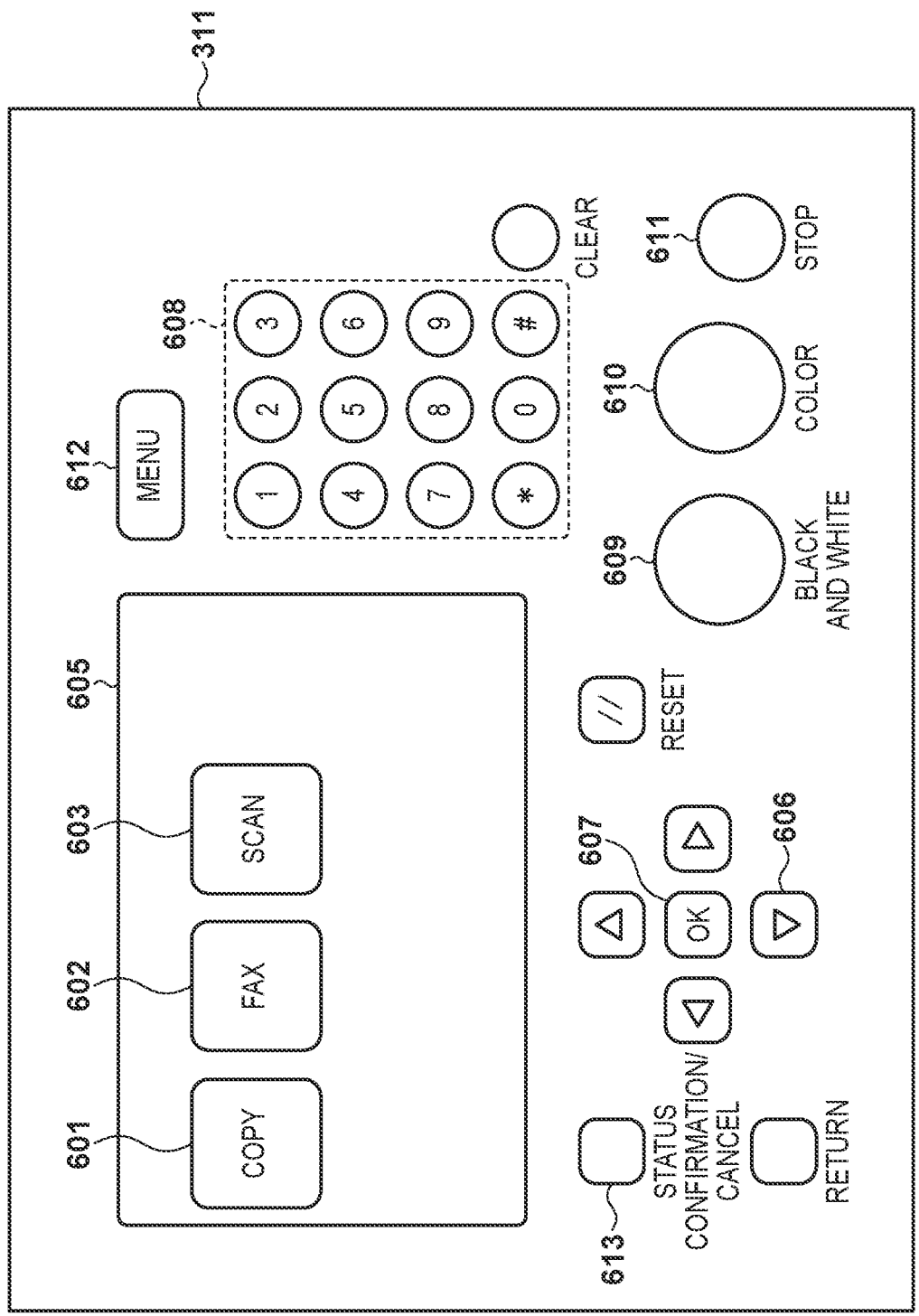
FIG. 3 is an explanatory diagram for an operation panel of the printing apparatus in present embodiments.

FIG. 3 is a diagram for explaining an operation panel 411 of the printing apparatus 101. A display panel 605 is a display panel using an LCD or the like. A copy button 601 is a button to be pressed when copying is to be performed using the printing apparatus 100, and when this button is pressed, a copy operation screen is displayed on the display panel 605. A facsimile button 602 is a button to be pressed when a facsimile transmission is to be performed using the printing apparatus 101, and when this button is pressed, a facsimile operation screen is displayed on the display panel 605. A scan button 603 is a button to be pressed when scanning is to be performed using the printing apparatus 101, and when this button is pressed, a scan operation screen is displayed on the display panel 605. A ten-key pad 608 is used for inputting numbers and the like. An OK key 607 is used to decide upon the display content of the display panel 605. Direction keys 606 are used to select a menu or the like displayed on the display panel 605. A black and white copy button 609 and a color copy button 610 are used when performing black and white copying and color copying, respectively. A stop button 611 is used to stop processing. A menu button 612 is used to display a setting screen 701 for making settings on the printing apparatus 101. A status confirmation button 613 is used to confirm the status of the printing apparatus 101, such as a list of print jobs received by the printing apparatus 101.

● User Interface

Figure 4:
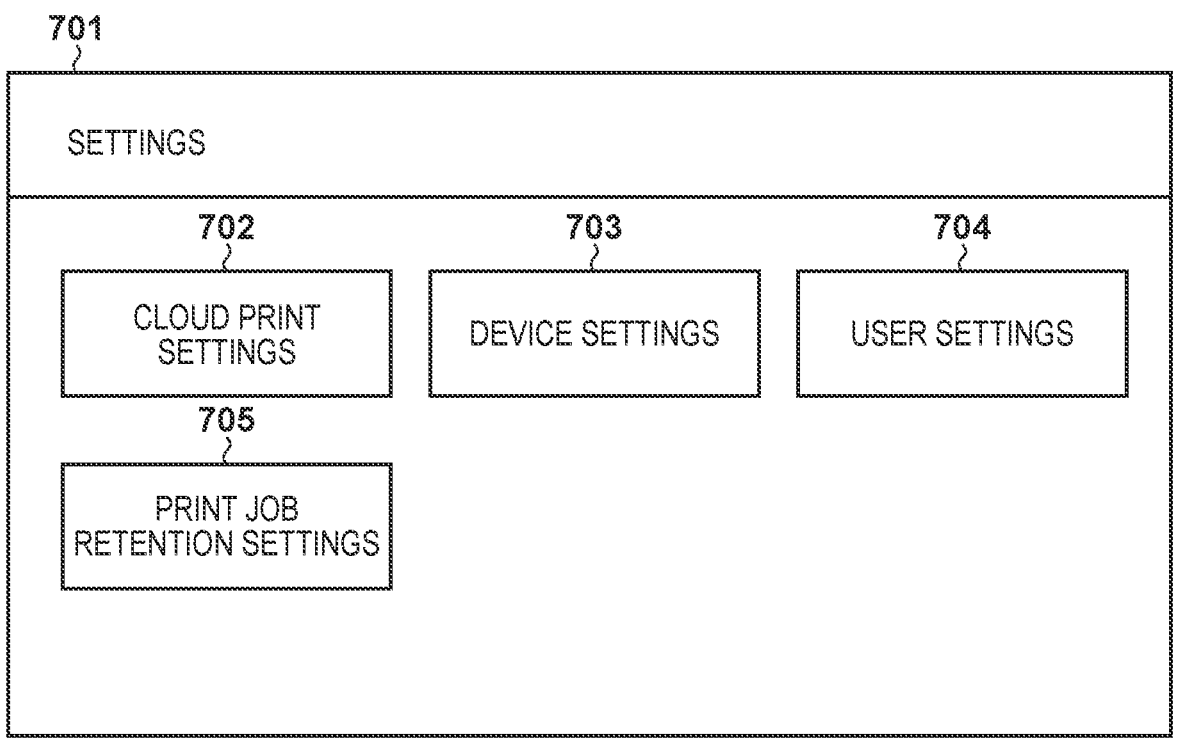
FIG. 4 is a setting screen configuration diagram.

FIG. 4 illustrates a setting screen 701 displayed on the display panel 605 for the user to instruct various settings. This screen itself has no specific setting items, and is an intermediate hierarchy serving as a guide to detailed setting items. By pressing a button 702, it is possible to display a cloud print setting screen 801 illustrated in FIG. 5. By pressing a button 703, it is possible to display a device setting screen (not illustrated). By pressing a button 704, it is possible to display a user setting screen (not illustrated). By pressing a button 705, it is possible to display a print job retention setting screen 901 illustrated in FIG. 6.

Figure 5:
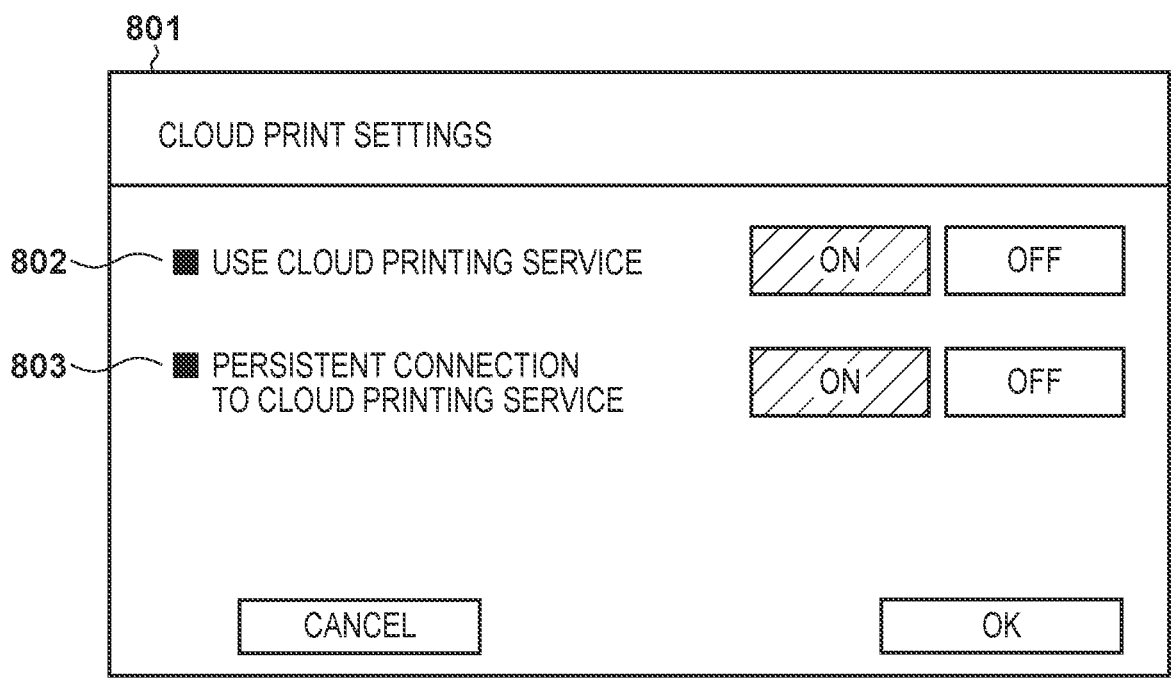
FIG. 5 is a setting screen configuration diagram.

FIG. 5 is the cloud print setting screen 801 displayed on the display panel 605. A setting item 802 can set the print function (cloud print function) to be ON or OFF using the cloud printing service 102. By the persistent cloud print connection setting 803, it is possible to set whether or not the network connection is persistently maintained when the printing apparatus 101 detects an event from the cloud printing service 102. By pressing the OK button, the setting screen 701 can be displayed after the setting content is stored in the storage unit 505. By pressing the cancel button, the setting screen 701 can be displayed after the setting content is stored in the storage unit 505.

Figures 6, 7:
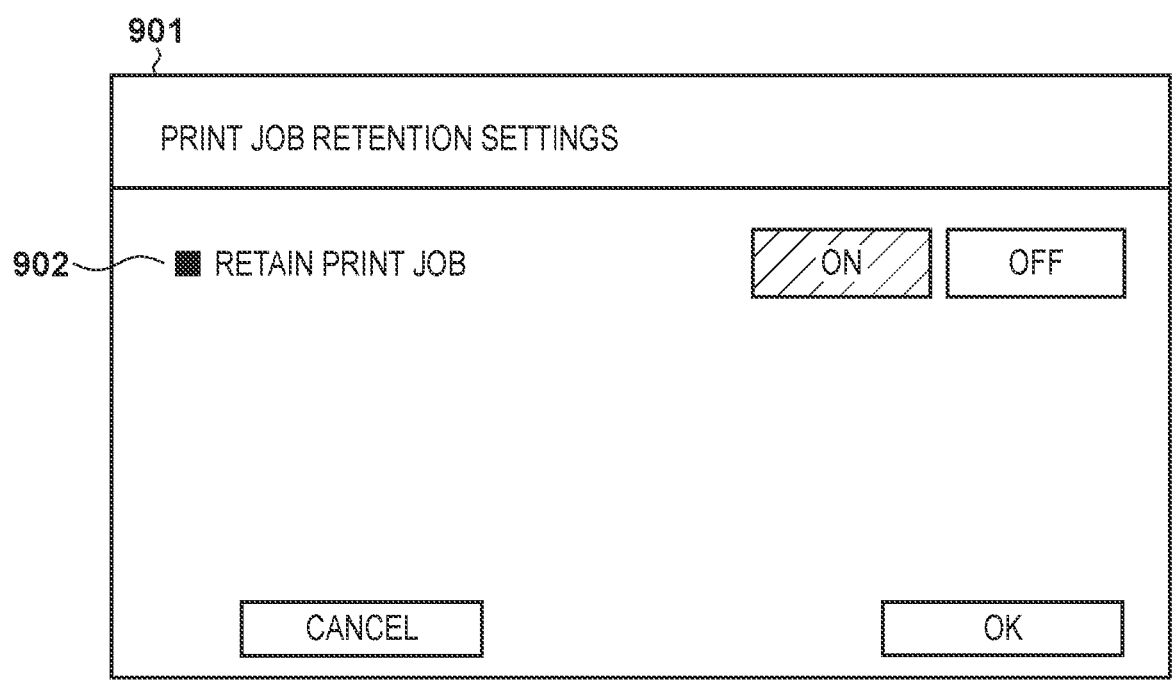
FIG. 6 is a setting screen configuration diagram.
FIG. 7 is an explanatory diagram for user account information in the printing apparatus.

FIG. 6 illustrates the print job retention setting screen 901 displayed on the display panel 605. In a print setting item 902, a print job retention function can be set to ON/OFF. By pressing the OK button, the setting screen 701 can be displayed after the setting content is stored in the storage unit 505. By pressing the cancel button, the setting screen 701 can be displayed without storing the setting content in the storage unit 505, in other words without changing the current settings. Here, the print job retention function is a function for storing a print job received by the printing apparatus 101 in the storage unit 505 without immediately printing the print job, and printing the print job at a timing when the user operates the operation panel of the printing apparatus 101 to give a print instruction.

● User Management Information

FIG. 7 is a diagram illustrating user management information held by the printing apparatus 101. The user management information includes a user account name 1000, an authority 1001, a cloud account name 1002, and a password 1003, and is stored in the storage unit 505. The user account name 1000 is ID information for uniquely identifying a user in the printing apparatus 101. The authority 1001 is information indicating authority of each user. Functions permitted within the authority are indicated here. The cloud account name 1002 is information indicating a cloud account associated with the user account name 1000. This indicates, for example, an identification name for using the cloud printing service. The password 1003 is information indicating a password required when the user logs in to the printing apparatus 101 in the user account name 1000. The user management information is information necessary for the user to log in and use the printing apparatus 101, and may be separately registered in accordance with the registration procedure of the user.

● Cloud Print

Here, the registration of the printing apparatus 101 in the cloud printing service 102 and the operation of cloud print will be described with reference to an embodiment. In the present embodiment, the explanation uses IPP-Infra as a protocol between the printing apparatus 101 and the cloud service 102.

Figure 8:
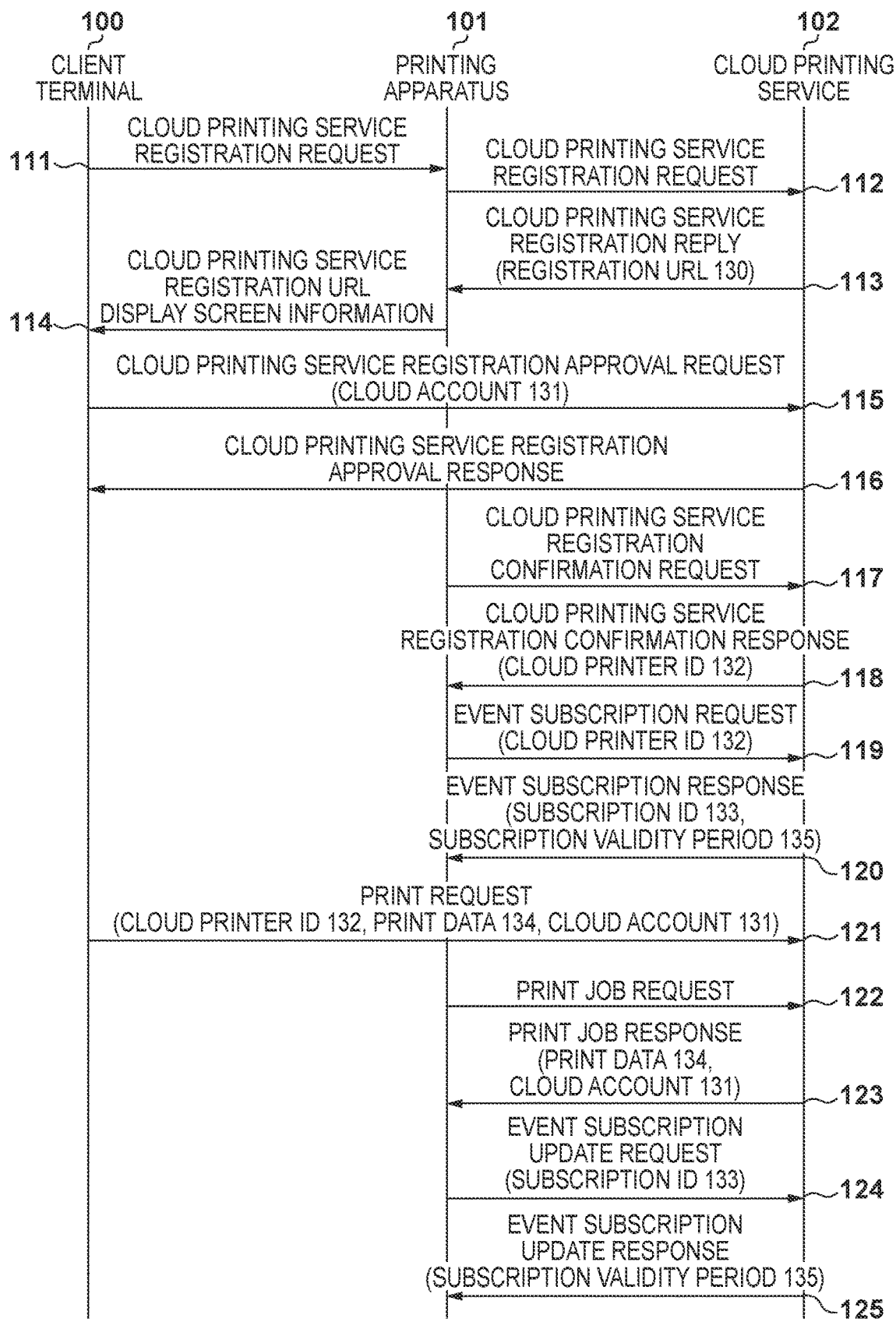
FIG. 8 is a cloud print processing sequence diagram.

FIG. 8 is a diagram illustrating a cloud print processing sequence. The printing apparatus 101 supports a cloud print function and a WebUI function for operating the printing apparatus 101. The client terminal 100 supports a cloud print client function and a WebUI client for operating WebUI. The cloud printing service 102 represents a cloud printing service on the Internet.

First, the user transmits a cloud printing service registration request 111 to the printing apparatus 101 via WebUI using a WebUI client of the client terminal 100. Upon receiving the request 111, the printing apparatus 101 transmits a cloud printing service registration request 112 to the cloud printing service 102. Upon receiving the request 112, the cloud printing service 102 transmits to the printing apparatus 101 a cloud printing service registration request reply 113 including a registration URL 130 for cloud print registration. When the printing apparatus 101 receives the response 113, it transmits registration URL display screen information 114 including the cloud printing service registration URL to the client terminal 100 via WebUI.

Upon receiving the screen information 114, the client terminal 100 displays the registration URL on the WebUI client. The user operates the WebUI client of the client terminal 100 and accesses the displayed registration URL. As a result, the client terminal 100 transmits a cloud printing service registration approval request 115 including a cloud account name 131 to the cloud printing service 102. Upon receiving the registration approval request 115, the cloud printing service 102 transmits a cloud printing service registration approval response 116 to the client terminal 100.

The printing apparatus 101 transmits a cloud printing service registration confirmation request 117 to the cloud printing service 102. When the cloud printing service 102 receives the registration confirmation request 117, the cloud printing service 102 transmits a cloud printing service registration confirmation response 118 including a cloud printer ID 132 to the printing apparatus 101. At this stage, the printing apparatus 101 enters a state of being registered with the cloud printing service 102 and becomes able to use the cloud printing service.

The printing apparatus 101 transmits an event subscription request 119 to the cloud printing service 102. Upon receiving an event subscription request 119, the cloud printing service 102 transmits a cloud subscription response 120 including a subscription ID 133 and a subscription validity period 135 to the printing apparatus 101. At this stage, the printing apparatus 101 can receive event notifications related to the printing apparatus 101 from the cloud printing service 102. Note that the subscription ID 133 needs to be valid in order to receive the notification of events. In order to receive the event notifications, the printing apparatus 101 performs a subscription update process 124 when the subscription validity period 135 is nearly expired.

When the cloud printing service becomes available as described above, the client terminal 100 transmits a print request (or print job) 121 including the cloud printer ID 132, the print data 134, and the cloud account name 131 to the cloud printing service 102. The printing apparatus 101 transmits a print job request 122 to the cloud printing service 102. The cloud printing service 102 transmits a print job response 123 including the print data 134 and the cloud account name 131 to the printing apparatus 101. The printing apparatus 101 prints the received print data. The print job request 122 in the sequence of FIG. 8 is transmitted by the printing apparatus 101 after it detects that a print job addressed to itself has been transmitted to the cloud printing service 102. More specifically, the method by which the printing apparatus 101 detects that the print job has been transmitted is realized by the reception of an event notification indicating a print job registration event from the cloud printing service 102. This method will be described below with reference to FIG. 9.

● Obtaining Event Notifications

Figure 9:
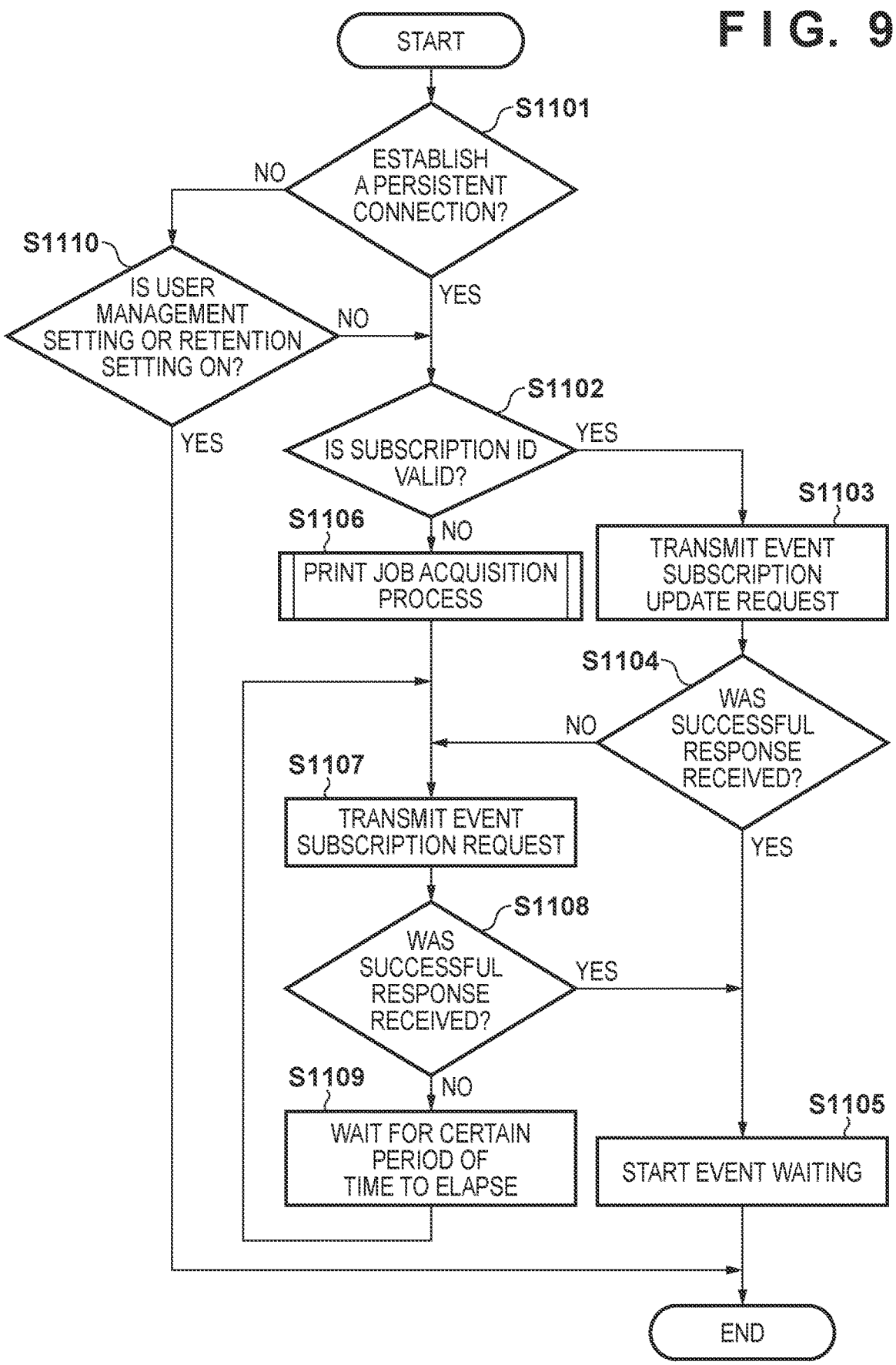
FIG. 9 is a flowchart for execution of processing on the printing apparatus in embodiments.

FIG. 9 is a processing flow for enabling the printing apparatus 101 to subscribe to events in relation to the cloud printing service 102. All of the processes of FIG. 9 performed by the printing apparatus 101 are performed by the CPU 401 reading a program stored in the ROM 404 and performing arithmetic operations. When the printing apparatus 101 is registered in the cloud printing service 102 or when the printing apparatus 101, after having been registered in the cloud printing service 102, is activated, the printing apparatus 101 starts processing for enabling subscription to events to the cloud printing service 102.

In step S1101, the cloud print event control unit 508 refers to the storage unit 505, acquires the cloud print setting information 803 set in the printing apparatus 101, and determines whether to establish a persistent connection to the cloud printing service 102. Step S1102 is executed in the case of a persistent connection, and step S1110 is executed otherwise. In step S1102, the cloud print event control unit 508 determines whether or not the subscription ID 133 allocated from the cloud printing service 102 is valid. Specifically, if the subscription validity period 135 notified at the same time as the subscription ID 133 has not expired, it is determined to be valid and step S1103 is executed. If the subscription validity period 135 has expired or the subscription ID 133 is not stored in the storage unit 505, such as at the time of initial registration, it is determined to be invalid and step S1106 is executed.

In step S1103, the cloud print event control unit 508 transmits the event subscription update request 124 to the cloud printing service 102. In step S1104, the cloud print event control unit 508 receives an event subscription update response 125 from the cloud printing service 102. FIG. 14A and FIG. 14B illustrate examples of specific communication sequences of an event subscription update process between the printing apparatus 101 and the cloud printing service 102 in step S1103 and step S1104. The printing apparatus 101 transmits a Renew-Subscription request 1601 as the event subscription update request described in step S1103. At this time, the subscription ID 133 is set in a subscription-id attribute. The cloud printing service 102 returns the result of the process for updating the subscription ID 133 set in the subscription-id attribute of the received Renew-Subscription request 1601 to the printing apparatus 101 as an event subscription update response. At this time, if it is determined that the subscription ID 133 is valid, the cloud printing service 102 performs an updating process and transmits a Success response 1602 (FIG. 14A). At this time, the subscription validity period 135 is set in a notify-release-duration attribute. On the other hand, the cloud printing service 102 returns an Error response 1603 to the printing apparatus 101 when the subscription ID is determined to be invalid (FIG. 14B).

In step S1104, when the received event subscription update response was a Success response, the cloud print event control unit 508 stores the subscription validity period 135 set in notify-release-duration attribute in the storage unit 505, and executes step S1105. In step S1105, the cloud print event control unit 508 starts an event waiting process. The event waiting process will be described with reference to FIG. 11.

When it is determined in step S1102 that the subscription ID of the event notification is not valid, the cloud print event control unit 508 makes a request to a cloud print job acquisition control unit to perform a print job acquisition process in step S1106. This is to acquire and process print jobs for the printing apparatus 101 transmitted to the cloud printing service 102 during the period in which the subscription ID is invalid. The print job acquisition process will be described with reference to FIG. 12. In step S1107, the cloud print event control unit 508 transmits to the cloud printing service 102 the event subscription request 119. In step S1108, the cloud print event control unit 508 receives from the cloud printing service 102 an event subscription response 120.

Figure 13A:
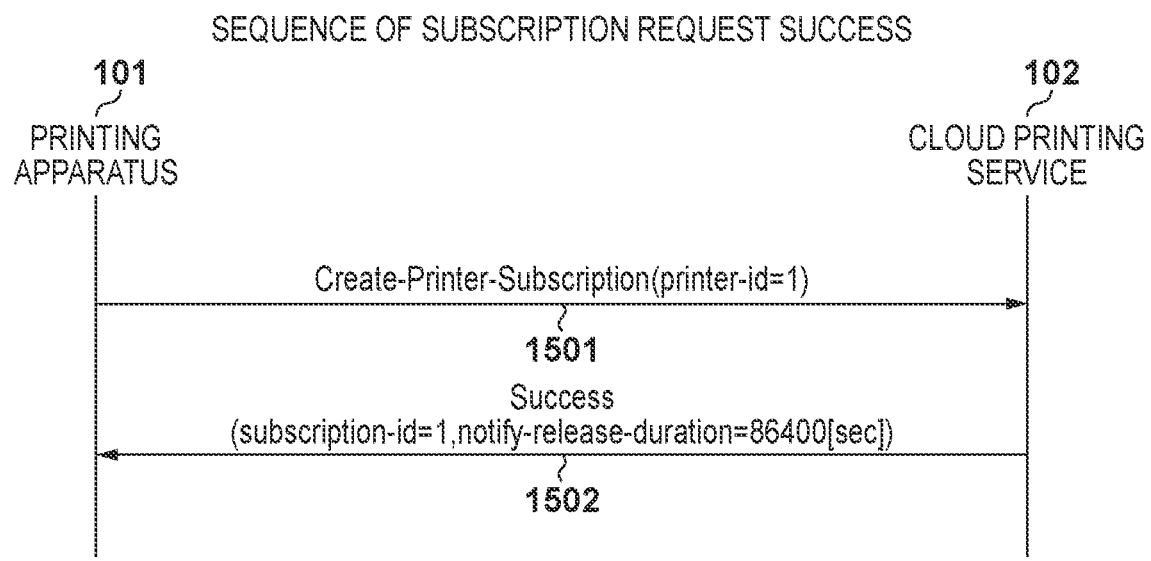
FIG. 13A and FIG. 13B are sequence diagrams of communication processing between the printing apparatus and the cloud printing service according to embodiments.
Figure 13B:
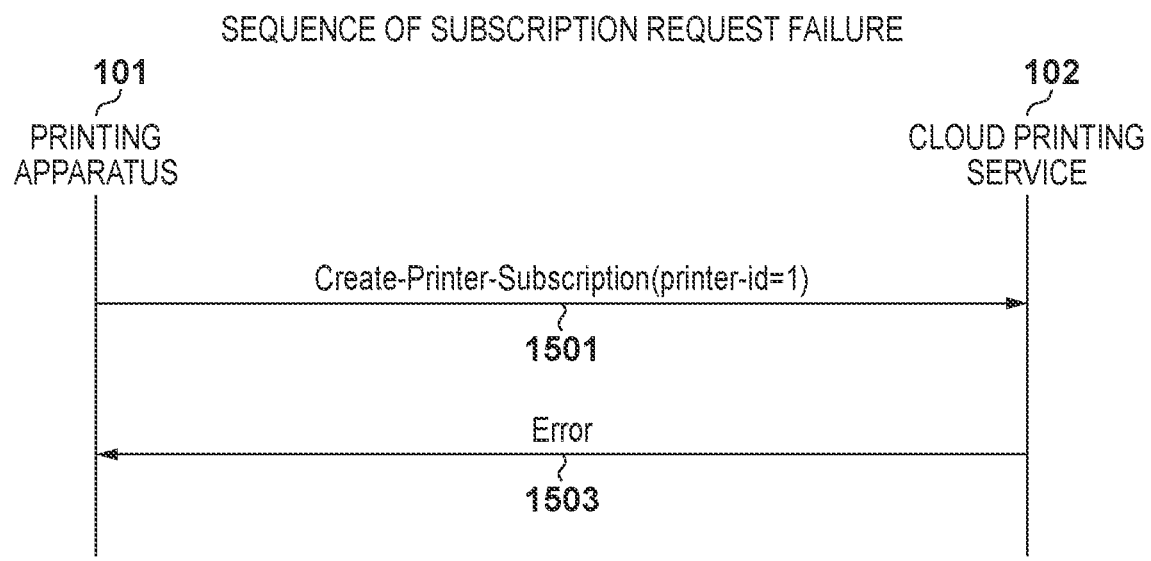

FIG. 13A and FIG. 13B illustrate examples of specific communication sequences of an event subscription request process between the printing apparatus 101 and the cloud printing service 102 in step S1107 and step S1108. The printing apparatus 101 transmits a Create-Printer-Subscription 1501 to the cloud printing service 102 as the event subscription request described in step S1107. At this time, the printing apparatus 101 sets the cloud printer ID 132 allocated at the time of registration with the cloud printing service 102 to a printer-id attribute. The cloud printing service 102 performs processing for assigning the subscription ID in relation to the cloud printer ID 132 set in the printer-id attribute of the received Create-Printer-Subscription 1501, and responds to the printing apparatus 101 with the event subscription response described in step S1108, which indicates the result thereof. At this time, if it is determined that the cloud printer ID 132 is valid, the cloud printing service 102 performs assignment of the subscription ID 133 and transmits a Success response 1502 (FIG. 13A). At this time, the subscription ID 133 assigned to the subscription-id attribute is set, and the subscription validity period 135 is set to the notify-release-duration attribute. On the other hand, the cloud printing service 102 responds with an Error response 1503 if it is determined that the cloud printer ID 132 is invalid (FIG. 13B).

In step S1108, the cloud print event control unit 508 determines whether the event subscription response 120 received from the cloud printing service 102 is a Success response (successful response), and if it is a successful response, the subscription validity period 135 set in notify-release-duration attribute is stored in the storage unit 505, and step S1105 is executed. Otherwise, the cloud print event control unit 508 waits in step S1109 for a certain period of time and then retries from step S1107.

When it is determined in step S1101 that a persistent connection is not to be made, the cloud print event control unit 508 refers to the storage unit 505 in step S1110, acquires a user management setting and a print job retention setting, and determines whether these setting items are respectively ON/OFF. When both of the settings are OFF, the cloud print event control unit 508 executes step S1102 and subsequent processes. Otherwise, if either or both of the setting items are ON, the cloud print event control unit 508 ends this processing flow. This is because the printing apparatus 101 does not need to detect and process a print job for the printing apparatus 101 transmitted to the cloud printing service 102 until the user presses the status confirmation button 613 in order to confirm the user's login or jobs retained in the printing apparatus 101.

● Event Subscription Update

Figure 10:
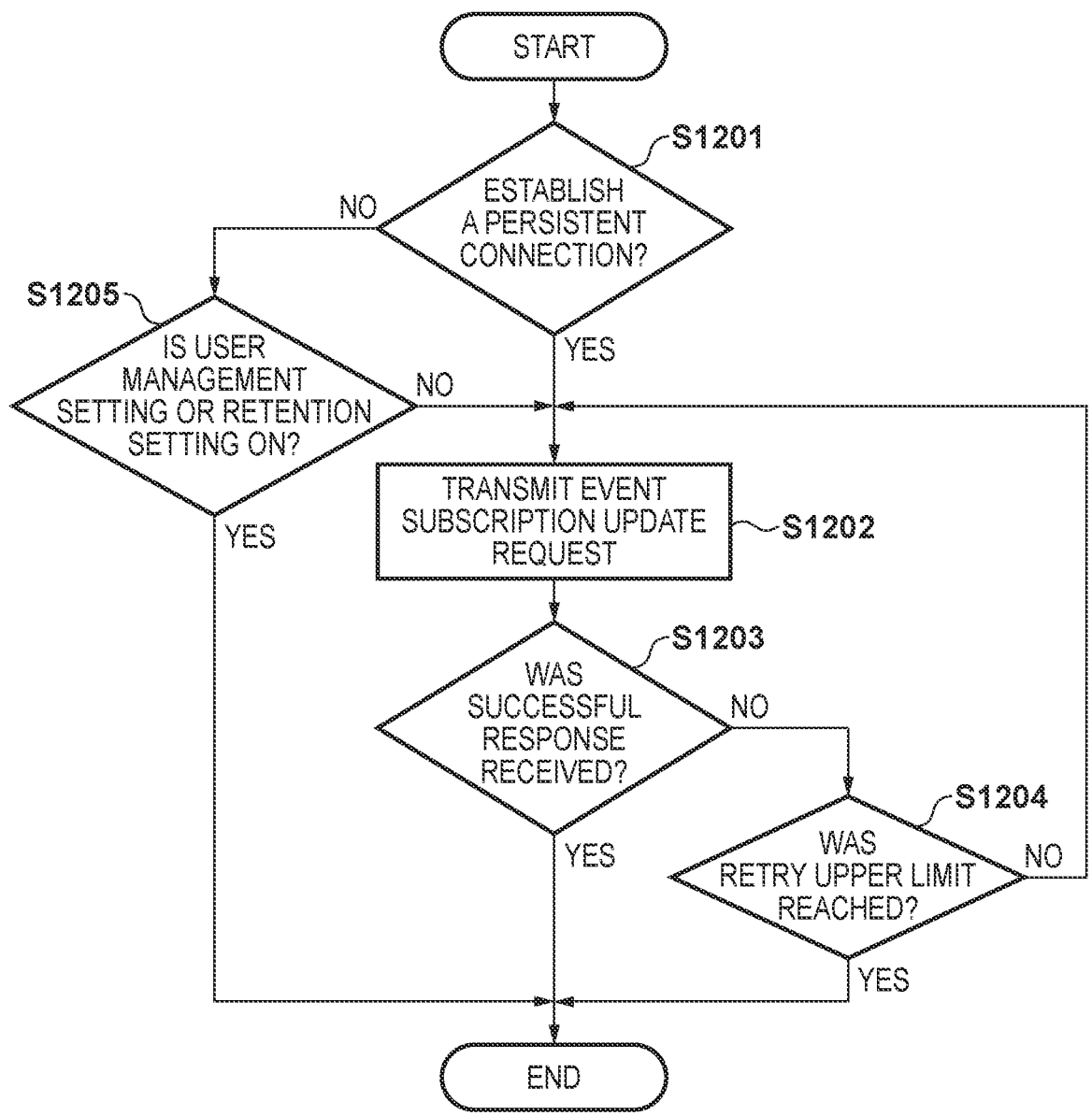
FIG. 10 is a flowchart for execution of processing on the printing apparatus in embodiments.

FIG. 10 is a flow chart illustrating the process of updating the subscription ID 133 allocated from the cloud printing service 102 as a result of the printing apparatus 101 making a request to subscribe to events to the cloud printing service 102. All of the processes of FIG. 10 performed by the printing apparatus 101 are performed by the CPU 401 reading a program stored in the ROM 404 and performing arithmetic operations. In step S1104 and step S1108, the cloud event control unit 508 stores a subscription validity period 135 set in notify-release-duration attributes in the storage unit 505 when the Success response is received. In the present embodiment, it is assumed that this processing is started when half of the subscription validity period 135 has elapsed. However, the execution timing of the subscription ID 133 update processing described with reference to FIG. 10 is not limited as long as the timing of the execution is before the subscription validity period 135 expires.

In step S1201, the cloud print event control unit 508 refers to the storage unit 505, acquires the cloud print setting information 803 set in the printing apparatus 101, and determines whether to establish a persistent connection to the cloud printing service 102. Step S1202 is executed in the case of a persistent connection, and step S1204 is executed otherwise. The processing of step S1202 is the same Renew-Subscription processing of step S1103, and therefore explanation thereof is omitted. In step S1203, when the received event subscription update response is determined to be a Success response, the cloud print event control unit 508 stores the subscription validity period 135 set in notify-release-duration attribute in the storage unit 505, and ends the processing for updating the subscription ID. When it is determined in step S1203 that an Error response has been received, the cloud print event control unit 508 determines in step S1204 whether or not the subscription ID updating process has reached the upper limit for retries (e.g., three times), and if not, the process is retried from step S1202. The retry upper limit of the subscription ID update processing is not limited.

In step S1205, the cloud print event control unit 508 refers to the storage unit 505, acquires the user management setting and the print job retention setting, and determines whether the respective setting items are ON/OFF. When both of the settings are OFF, the cloud print event control unit 508 executes step S1202 and subsequent processes. Otherwise, if either or both of the setting items are ON, the cloud print event control unit 508 ends this processing flow. This is because the printing apparatus 101 does not need to detect and process a print job for the printing apparatus 101 transmitted to the cloud printing service 102 until the user presses the status confirmation button 613 in order to confirm the user's login or the job retained in the printing apparatus 101, and the processing for updating the subscription ID is not necessary.

● Event Detection

Figure 11:
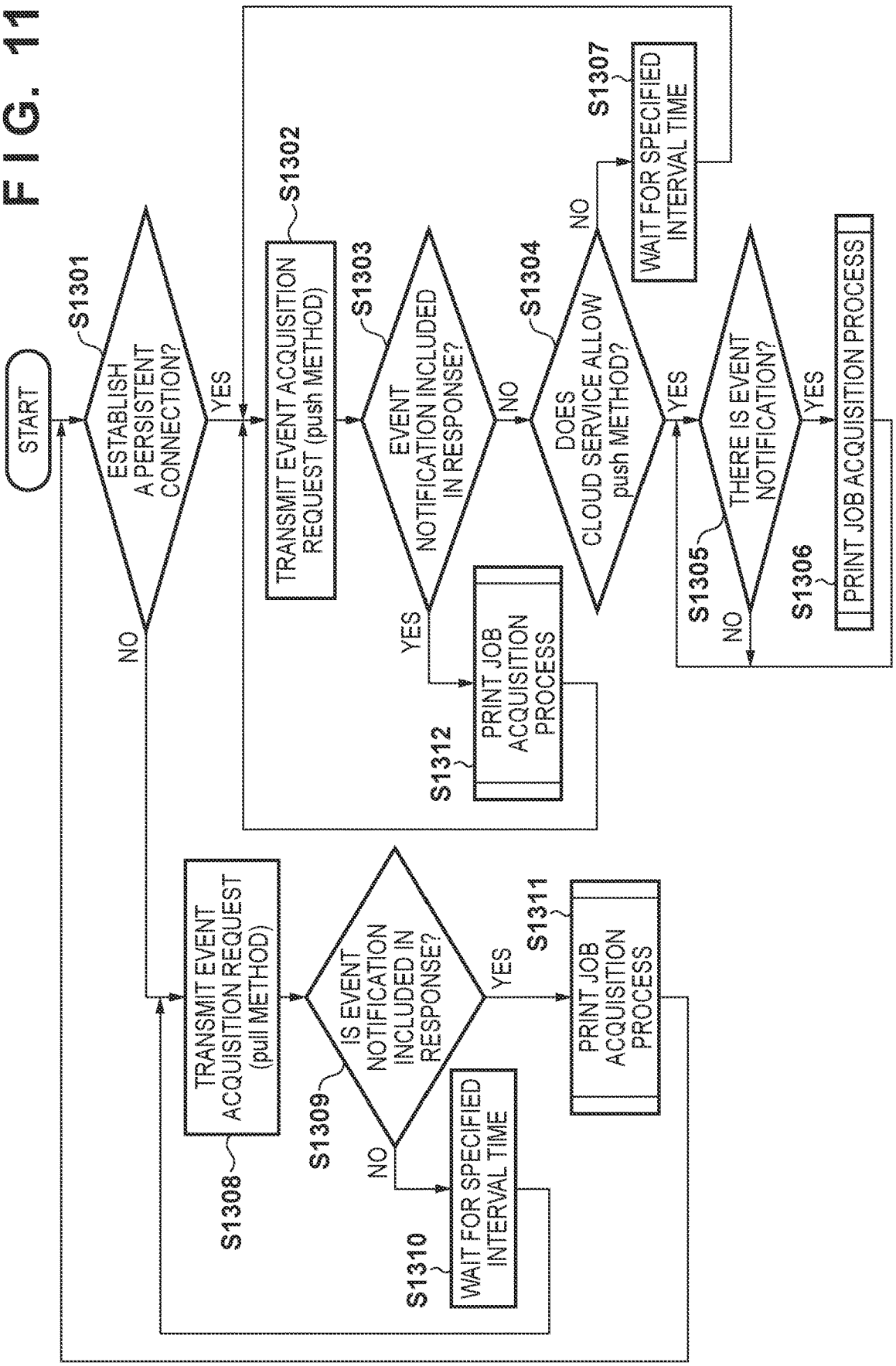
FIG. 11 is a flowchart for execution of processing on the printing apparatus in embodiments.
Figure 15:
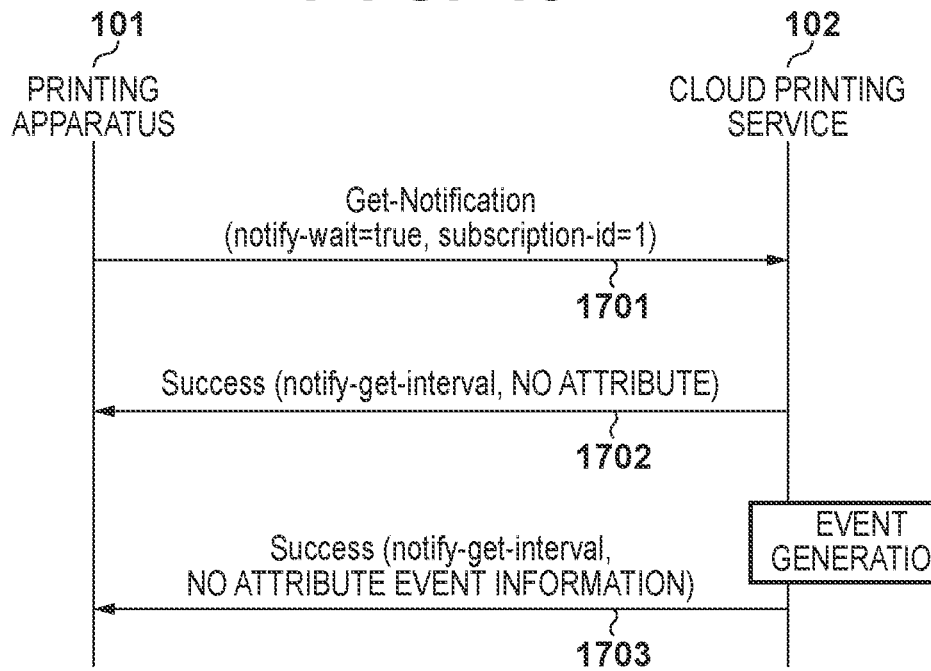
FIG. 15 is a sequence diagram of communication processing between the printing apparatus and the cloud printing service according to embodiments.
Figure 16:
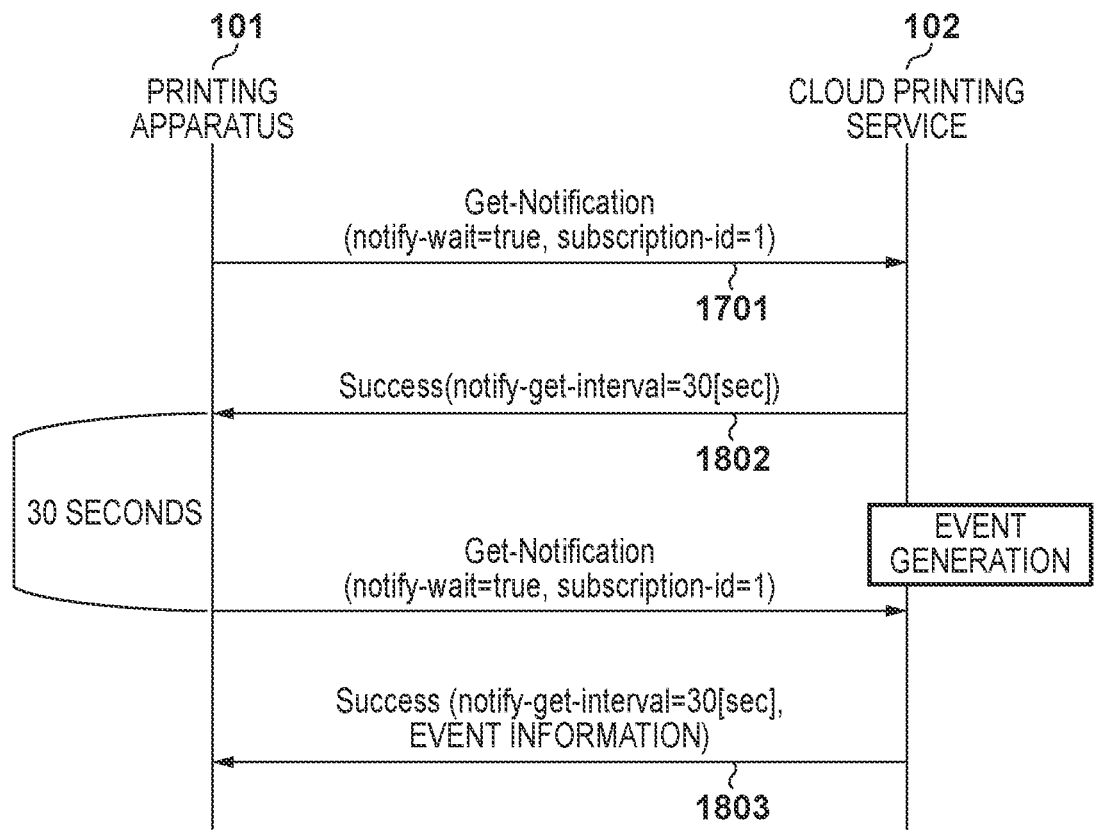
FIG. 16 is a sequence diagram of communication processing between the printing apparatus and the cloud printing service according to embodiments.
Figure 17:
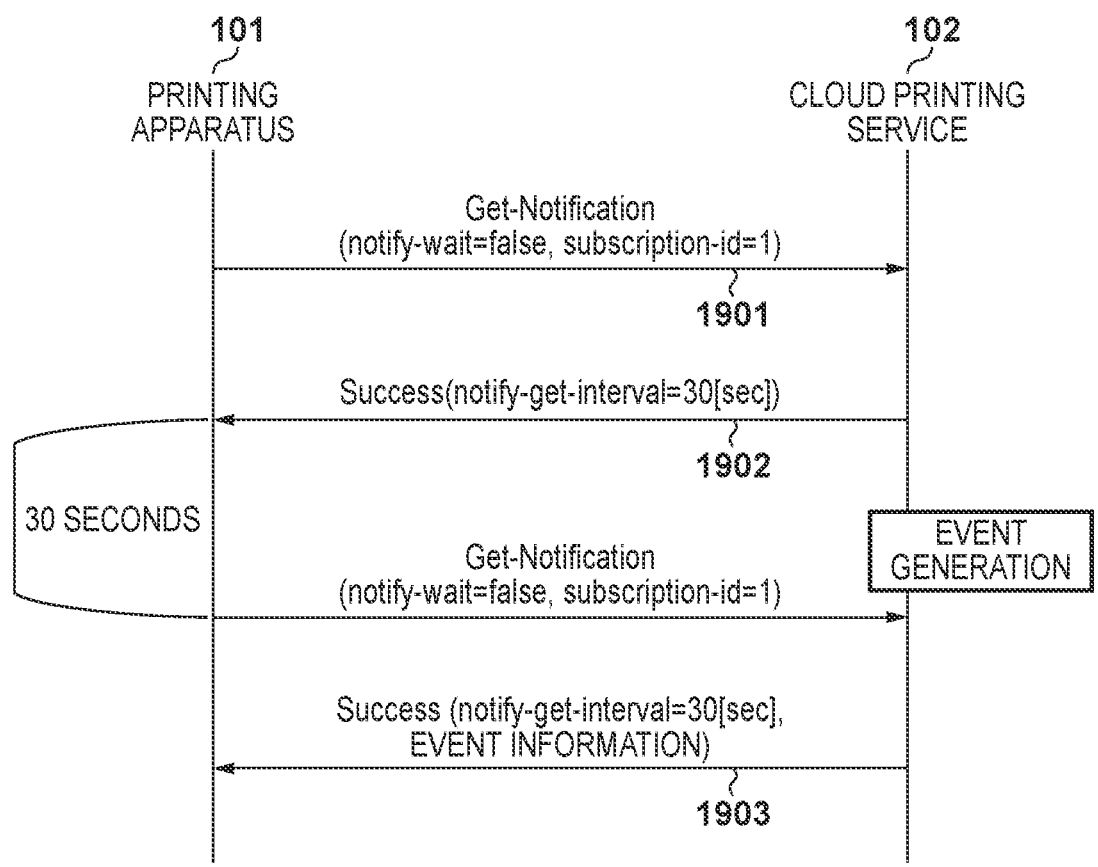
FIG. 17 is a sequence diagram of communication processing between the printing apparatus and the cloud printing service according to embodiments.

FIG. 11 is a flowchart illustrating event detection processing for the printing apparatus 101 to receive an event notification from the cloud printing service 102. FIG. 15, FIG. 16, and FIG. 17 are sequence diagrams illustrating examples of event notification processing between the printing apparatus 101 and the cloud printing service 102 in the event detection processing described with reference to FIG. 11. All of the processes of FIG. 11 performed by the printing apparatus 101 are performed by the CPU 401 reading a program stored in the ROM 404 and performing arithmetic operations. This process is started in step S1105 described with reference to FIG. 9.

In step S1301, the cloud print event control unit 508 refers to the storage unit 505, acquires the cloud print setting information 803 set in the printing apparatus 101, and determines whether to establish a persistent connection to the cloud printing service 102. In the case of a persistent connection, step S1302 is executed; otherwise, the cloud print event control unit 508 executes the event detection process of the pull method of step S1308 and step S1309.

In step S1302, the cloud print event control unit 508 transmits an event acquisition request of the push method to the cloud printing service 102. More specifically, the cloud print event control unit 508 transmits to the cloud printing service 102 a Get-Notification request (1701 in FIG. 15), in which true is set in a notify-wait attribute and a subscription ID 133 is set in a subscription-id attribute. As a result, the cloud print event control unit 508 requests the cloud printing service 102 to notify the event by the push method. Upon receiving a Get-Notification request (1701 in FIG. 15), the cloud printing service 102 determines whether events can be notified to the printing apparatus 101 by the push method. If the notification can be made by the push method, the cloud printing service 102 responds with a Success response (1702 in FIG. 15) without setting a notify-get-interval attribute. If the notification cannot be made by the push method, the cloud printing service 102 sets the desired job-acquisition interval as a notify-get-interval attribute and returns a Success response to the printing apparatus 101 (1802 in FIG. 16). When there is an event related to the subscription ID in the cloud printing service 102 at the time of transmitting the Success response, the cloud printing service 102 sets the event information in Success response.

In step S1303, the cloud print event control unit 508 determines whether the received Success response includes a job reception event. When the job reception event is included, the cloud print event control unit 508 executes the print job acquisition process of step S1312 and returns to the event acquisition request of step S1302. If the job reception event is not included, the cloud print event control unit 508 executes step S1304.

In step S1304, the cloud print event control unit 508 determines whether the cloud printing service 102 allowed event notification by the push method. Specifically, when the cloud print event control unit 508 receives a Success response (1702 in FIG. 15) from the cloud printing service 102 in which the notify-get-interval attribute is not set, it determines that the cloud printing service 102 has allowed event notification by the push method. When the cloud print event control unit 508 determines that the cloud printing service 102 has allowed event notification by the push method, it waits for event notification from the cloud printing service 102 while maintaining the network connection with the cloud printing service 102 (step S1305). When an event related to the subscription ID 133 occurs, the cloud printing service 102 uses the network connection to transmit to the printing apparatus 101 a Success response (1703 in FIG. 15) in which the event information is set. When a job reception event is received in step S1305 from the cloud printing service 102, the cloud print event control unit 508 executes the print job acquisition process of step S1306 and returns to the wait for event notification of step S1305. The print job acquisition process will be described with reference to FIG. 12.

In step S1304, the cloud print event control unit 508 determines whether or not the notify-get-interval attribute is set in the Success response received from the cloud printing service 102, and if it is set (1802 in FIG. 16), the cloud printing service 102 determines that the event notification by the push method was rejected, and executes step S1307. In step S1307, the cloud print event control unit 508 waits until the acquisition interval set in notify-get-interval attribute of the Success response (1802 in FIG. 16) indicating the event notification rejection in the push method has elapsed and returns to the processing of step S1302. If an event has occurred while waiting in step S1307, the cloud print event control unit 508 can receive a Success response including event data (1803 in FIG. 16) from the cloud printing service 102 in step S1302. As a result, the cloud print event control unit 508 periodically acquires an event by the pull method from the cloud printing service 102, and requests event notification by the push method. Therefore, the event notification method can be switched to the push method when the cloud printing service 102 becomes capable of event notification by the push method.

Step S1308 is performed when it is determined in step S1301 that the cloud print event control unit 508 is not to persistently connect to the cloud printing service 102. In step S1308, the cloud print event control unit 508 transmits to the cloud printing service a request to acquire events by the pull method. More specifically, the cloud print event control unit 508 transmits to the cloud printing service 102 a Get-Notification request (1901 in FIG. 17), in which false is set in a notify-wait attribute and a subscription ID 133 is set in a subscription-id attribute. As a result, the cloud print event control unit 508 makes a request to the cloud printing service 102 to notify the event by the pull method. The cloud print service 102 responds with a Success response (1902 in FIG. 17), setting the job-acquisition interval in the desired notify-get-interval attribute when the notify-wait attribute receives a false Get-Notification request (1901 in FIG. 17). Note that when there is an event related to the subscription ID 133 in the cloud printing service 102 at the time of transmitting the Success response, the cloud printing service 102 sets the event information in Success response.

In step S1309, the cloud print event control unit 508 receives a Success response (1902 in FIG. 17) in relation to the Get-Notification request (1901 in FIG. 17). Upon receiving the response, one communication session may be completed and the connection with the server (cloud printing service) completed (or disconnected). However, if the processing is performed in a lower protocol layer, it is possible to do nothing in particular in FIG. 11. The cloud print event control unit 508 determines whether the received Success response includes a job reception event. When a job reception event is included, the cloud print event control unit 508 executes the print job acquisition process (step S1311) and the processing returns to step S1301. If a job reception event is not included, the cloud print event control unit 508 waits until the acquisition interval set in the notify-get-interval attribute of Get-Notification request (1901 in FIG. 17) elapses in step S1310, and returns to step S1308 to perform the event acquisition process. Step S1311 and step S1312 are print job acquisition processes. The print job acquisition process will be described with reference to FIG. 12.

● Print Job Acquisition Process

Figure 12:
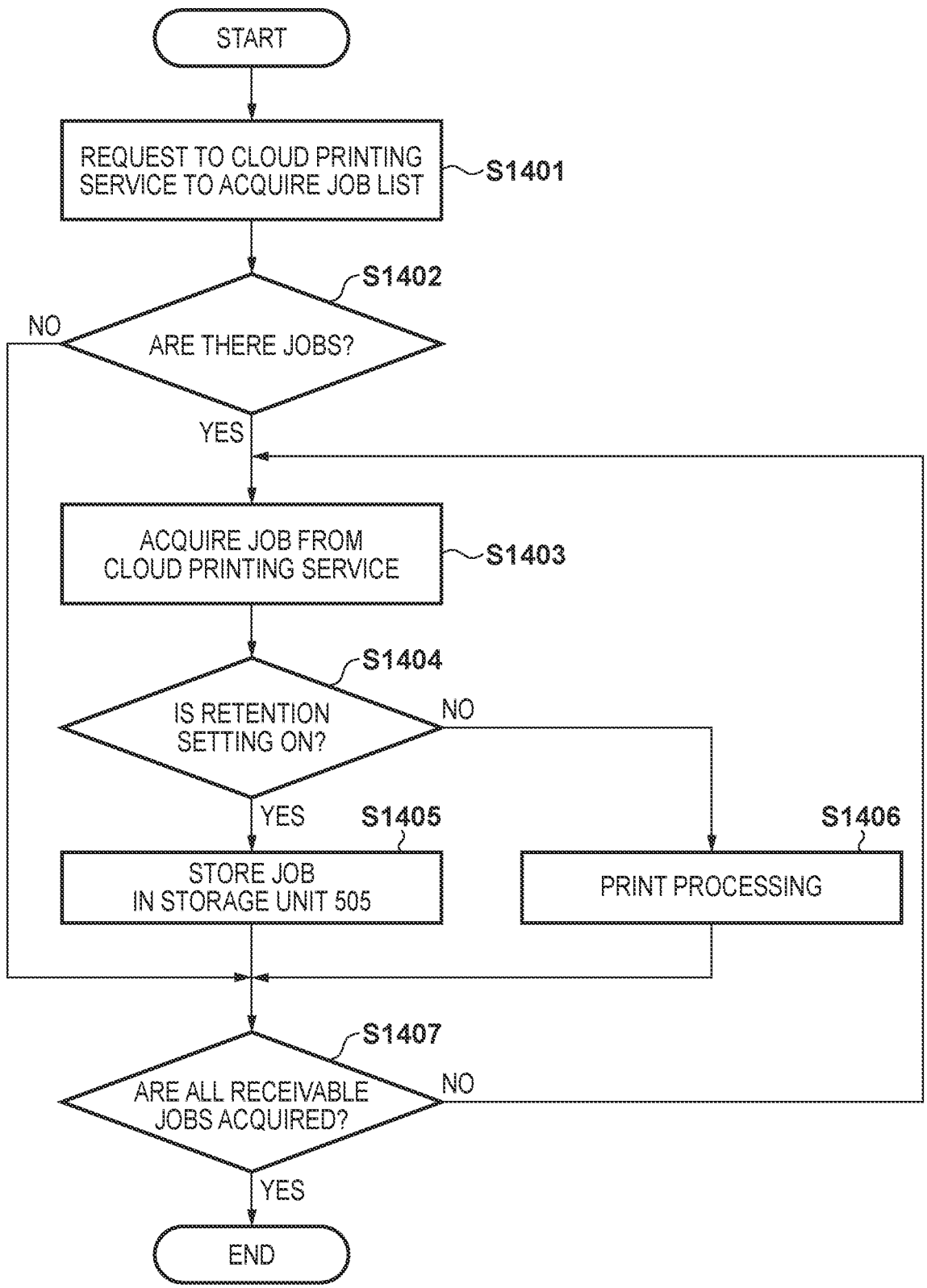
FIG. 12 is a flowchart for execution of processing on the printing apparatus in embodiments.
Figure 18:
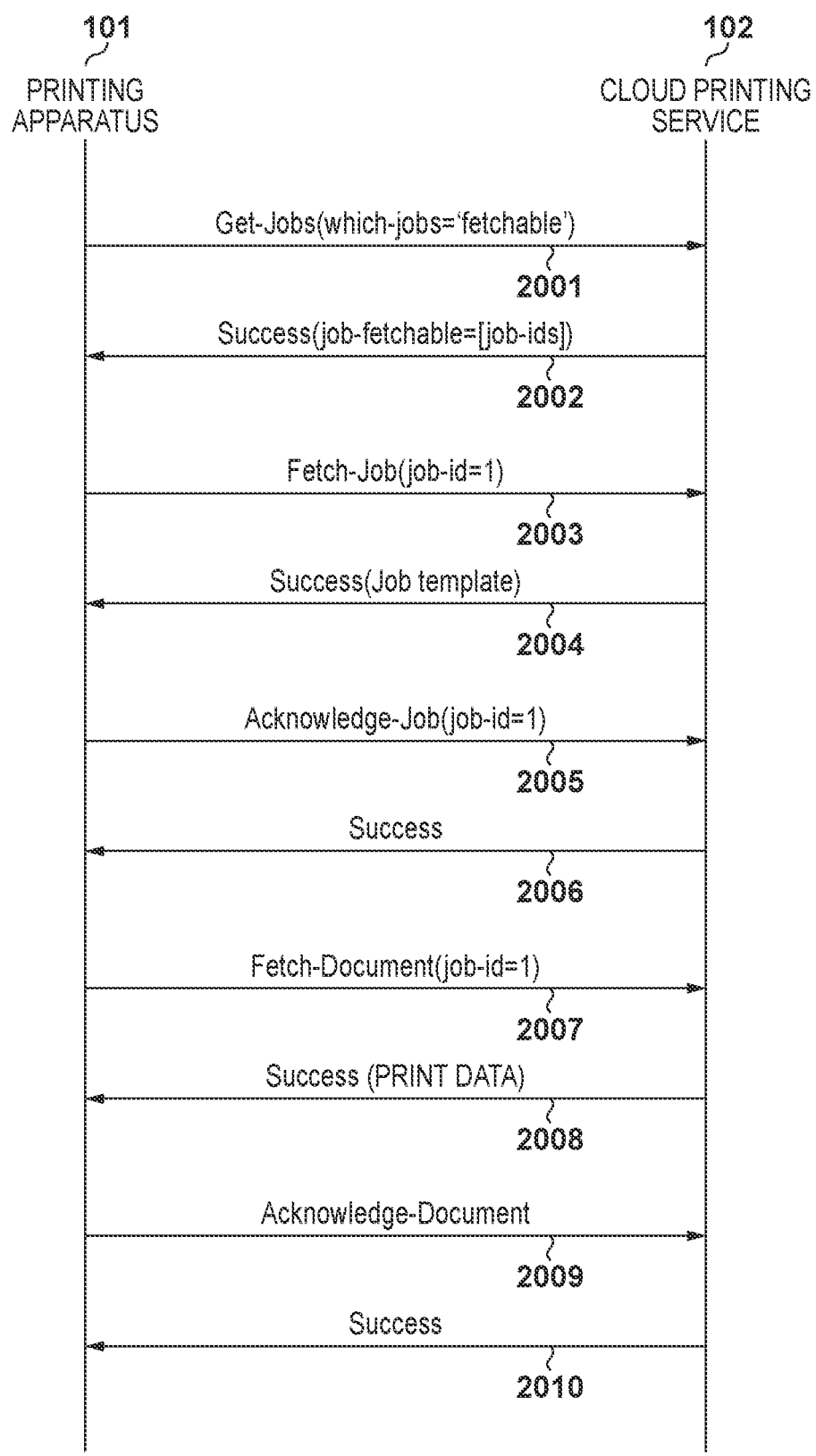
FIG. 18 is a sequence diagram of communication processing between the printing apparatus and the cloud printing service according to embodiments.

FIG. 12 is a flowchart illustrating processing for acquiring a print job that the printing apparatus 101 addressed to itself from the printing cloud service 102. This process corresponds to step S1106, step S1306, step S1311, step S1312 of FIG. 9 and FIG. 11. In FIG. 12, the processes that the printing apparatus 101 performs are all performed by the CPU 401 reading out a program stored in the ROM 404 and performing arithmetic operations. FIG. 18 illustrates an example of a specific communication process between the printing apparatus 101 and the cloud printing service 102 in the print job acquisition process of FIG. 12.

In FIG. 12, in step S1401, the cloud print job acquisition control unit 502 makes a request to the cloud printing service 102 to acquire a job list. The job list acquisition request is made by a Get-Jobs request 2001 (FIG. 18). At this time, "fetchable'" is set in the which-jobs attribute. As a result, a receivable job addressed to the printing apparatus 101 can be acquired.

In step S1402, the cloud print job acquisition control unit 502 determines whether there is a receivable job from the job list acquisition result received from the cloud printing service 102. Specifically, it is determined that there is a received job if at least one job-id is set in a job-fetchable attribute of the Success response (2002 in FIG. 18) received from the cloud printing service 102. If it is determined that there is a job reception, the cloud print job acquisition control unit 502 executes step S1403. Otherwise, the process ends.

In step S1403, the cloud print event control unit 508 acquires the print job data from the cloud printing service 102, and transfers the print job data together with the print instruction to the job control unit 510. The sequence of the communication processing between the printing apparatus 101 and the cloud printing service 102 in step S1403 in the print job acquisition processing corresponds to 2003 to 2010 in FIG. 18. The printing apparatus 101 transmits a Fetch-Job request 2003 to the cloud printing service 102 to request a job print setting. At this time, the job-id acquired in the Success response 2002 is set in a job-id attribute. The cloud printing service 102 transmits a Success response 2004 to the printing apparatus 101. At this time, print settings of jobs are set in a job-template attribute.

The printing apparatus 101 transmits an Acknowledge-Job request 2005 to the cloud printing service 102 when it successfully receives a print setting for the job in a Success response 2004. At this time, the job-id acquired in the Success response 2002 is set in a job-id attribute. When the cloud printing service 102 receives an Acknowledge-Job request 2005, the cloud printing service 102 transmits a Success response 2006 to the printing apparatus 101.

The printing apparatus 101 transmits a Fetch-Document request 2007 to the cloud printing service 102 when it successfully receives a print setting for the job in a Success response 2004. In this way, a request for print data is made. At this time, the job-id acquired in the Success response 2002 is set in a job-id attribute. The cloud printing service 102 transmits a Success response 2008 to the printing apparatus 101. At this time, the print data is transmitted at the same time.

The printing apparatus 101 transmits an Acknowledge-Document request 2009 to the cloud printing service 102 when it successfully receives print data in a Success response 2008. At this time, the job-id acquired in the Success response 2002 is set in the job-id attribute. When the cloud printing service 102 receives an Acknowledge-Document request 2009, the cloud printing service 102 transmits a Success response 2010 to the printing apparatus 101. In the sequence illustrated in FIG. 18, the cloud print job acquisition control unit 502 completes the print job acquisition process of step S1403. Thereafter, step S1404 of FIG. 112 is executed.

In step S1404, the job control unit 510 refers to the storage unit 505 to determine whether the print job retention setting is ON. In the case of ON, the job control unit 510 executes step S1405, and in the case of OFF, the job control unit 510 executes step S1406. In step S1405, the job control unit 510 stores the received print job data in the storage unit 505. The print job data stored in the storage unit 505 is displayed on the display panel 605 in a format such as a cloud job list 2101 of FIG. 19 when the user presses the status confirmation button 613 of the operation panel 411. FIG. 19 illustrates an example of a screen of a list of stored cloud print jobs displayed on the display panel 605. The user can select and print a desired print job from the cloud print job list 2101.

In step S1406, the job control unit 510 executes print processing by instructing the image processing unit 506 to print the received print job data.

In step S1407, the cloud print job acquisition control unit 502 determines whether all of the jobs from the job list acquired in step S1401 from the cloud printing service 102 have been acquired. In the case where all have been acquired, the process ends. When there is an unacquired job, the cloud print job acquisition control unit 502 returns to step S1403 and executes a print job acquisition process.

Other Examples

Note that even when the persistent connection is set, the persistent connection need not be performed and priority may be given to other settings of the printing apparatus 101. For example, when the power setting is for low power consumption, configuration may be taken so as to not have a persistent connection regardless of the setting. Conversely, the persistent connection may be performed, prioritizing other settings of the printing apparatus 101.

Further, in the present embodiment, as an example, a case where the determination of step S1201 of FIG. 10 differs depending on the setting as to whether or not to make a persistent connection illustrated in FIG. 5 is exemplified, but limitation is not made thereto. For example, in place of the setting item of 803, it may be possible to set which of the pull mode and the push mode is used. In this case, in step S1202, the printing apparatus 101 may advance to processing to step S1205 when the pull mode is set, and may advance the processing to step S1202 when the push mode is set. For example, a connection mode such as "connection mode 1", "connection mode 2", or the like may be set instead of the setting of 803. In this case, in step S1202, the printing apparatus 101 may switch the process according to the set connection mode. For example, when the connection mode 1 is set, the processing may be advanced to step S1202, and when the connection mode 2 is set, the processing may be advanced to step S1205.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-092272, filed May 15, 2019 which is hereby incorporated by reference herein in its entirety.

What is claimed is:

1. An image forming apparatus operable to acquire an event notification indicating an occurrence of a print job from a server and to acquire the print job in accordance with content of the event notification, the image forming apparatus comprising:

at least one memory that stores a set of instructions; and
at least one processor that executes the instructions, the instructions, when executed, causing the image forming apparatus to perform operations comprising:
setting a setting value for communication with the server based on a user operation;
receiving the event notification in either one of a server push method and a pull method based on the setting value, wherein, in the server push method, the event notification is received from the server via a communication session established and being kept between the image forming apparatus and the server, and in the pull method, an event acquisition request is transmitted from the image forming apparatus to the server and the event notification is received as a response to the event acquisition request;

in a case where the event notification indicating the occurrence of the print job is received, acquiring the print job, wherein in a case where the server push method is rejected by the server, the event notification is received in the pull method.

2. The image forming apparatus according to claim 1, wherein the event acquisition request including, as an attribute, information on whether or not the push method is to be used, and the event notification is received from the server as a response to the event acquisition request.

3. The image forming apparatus according to claim 2, wherein the operations further comprise, in a case where the push method is rejected by the server as a result of the event acquisition request including, as an attribute, information indicating that the push method is to be used, transmitting the event acquisition request to the server at a time interval, wherein the time interval is notified from the server as a response to the event acquisition request including, as an attribute, information indicating that the push method is to be used.

4. The image forming apparatus according to claim 1, wherein in a case where print job retention is set, a storage process of storing the acquired print job in a storage unit of the image forming apparatus is executed, and in a case where print job retention is not set, a print process based on the acquired print job is executed.

5. The image forming apparatus according to claim 4, wherein the operations further comprise:

controlling to display a selection screen for selecting a print job to be printed from among print jobs stored in the storage unit in the processing in accordance with acceptance of a predetermined user operation; and executing printing based on the print job selected via the selection screen.

6. The image forming apparatus according to claim 1, wherein by the setting, either a first setting value for persistently keeping the communication session with the server or a second setting value for not persistently keeping the communication session the server is set as the operation setting of the image forming apparatus based on the user operation.

7. The image forming apparatus according to claim 1, wherein the acquired print job is includes print setting attribute and print data.

8. An image forming system including a server and an image forming apparatus, wherein the image forming apparatus sets a setting value related to communication with the server based on a user operation, and based on the set setting value, and receives an event notification in either one of a server push method and a pull method based on the setting value, wherein, in the server push method, the event notification is received from the server via a communication session established and being kept between the image forming apparatus and the server, and in the pull method, an event acquisition request is transmitted from the image forming apparatus to the server and the event notification is received as a response to the event acquisition request; and in a case where the event notification indicating an occurrence of the print job is received from the server, acquires the print job, and in a case where a predetermined condition is satisfied, the server transmits an event notification indicating the occurrence of a print job to the image forming apparatus, wherein in a case where the push method is rejected by the server, the event notification is received in the pull method.

9. A non-transitory computer-readable storage medium storing a program for causing a computer to execute a control method for an image forming apparatus operable to acquire an event notification indicating an occurrence of a print job from a server and acquire and execute the print job in accordance with content of the event notification, the control method comprising:

setting a setting value for communication with the server based on a user operation;

receiving the event notification in either one of a server push method or a pull method based on the setting value, wherein, in the server push method, the event notification is received from the server via a communication session established and being kept between the image forming apparatus and the server, and in the pull method, an event acquisition request is transmitted from the image forming apparatus to the server and the event notification is received as a response to the event acquisition request; and in a case where the event notification indicating the occurrence of the print job is received, acquiring the print job, wherein in a case where the server push method is rejected by the server, the event notification is received in the pull method.

10. A method for controlling an image forming apparatus operable to acquire an event notification indicating an occurrence of a print job from a server and to acquire and execute the print job in accordance with content of the event notification, the method comprising:

setting a setting value for communication with the server based on a user operation;

receiving the event notification either in a server push method or in a pull method based on the setting value, wherein, in the server push method, the event notification is received from the server via a communication session established and being kept between the image forming apparatus and the server, and in the pull method, an event acquisition request is transmitted from the image forming apparatus to the server and the event notification is received as a response to the event acquisition request; and in a case where the event notification indicating the occurrence of the print job is received, acquiring the print job, wherein in a case where the server push method is rejected by the server, the event notification is received in the pull method.

11. The control method of the image forming apparatus according to claim 10, wherein the event acquisition request including, as an attribute, information on whether or not the push method is to be used.

12. The control method of the image forming apparatus according to claim 11, wherein, in a case where the push method is rejected by the server as a result of the event acquisition request including, as an attribute, information indicating that the push method is to be used, the event acquisition request is transmitted to the server at a time interval, wherein the time interval is notified from the server as a response to the event acquisition request including as an attribute, information indicating that the push method is to be used.

13. The control method of the image forming apparatus according to claim 10, wherein wherein in a case where print job retention is set, a storage process of storing the acquired print job in the storage unit of the image forming apparatus is executed, and in a case where print job retention is not set, a print process based on the acquired print job is executed.

14. The control method of the image forming apparatus according to claim 13, further comprising:

controlling to display a selection screen for selecting a print job to be printed from among print jobs stored in the storage unit in the processing in accordance with acceptance of a predetermined user operation; and executing print processing based on the print job selected via the selection screen.

15. The method for controlling the image forming apparatus according to claim 10, wherein the setting includes setting as the operation setting of the image forming apparatus, based on the user operation, either a first setting value for persistently keeping the communication session with the server or a second setting value for not persistently keeping the communication session with the server.

16. The method for controlling the image forming apparatus according to claim 10, wherein the acquired print job is includes print setting attribute and print data.

* * * * *